Oct. 15, 1929.    G. TOLMAN    1,731,363
OFFSET HITCH
Filed Feb. 6, 1928
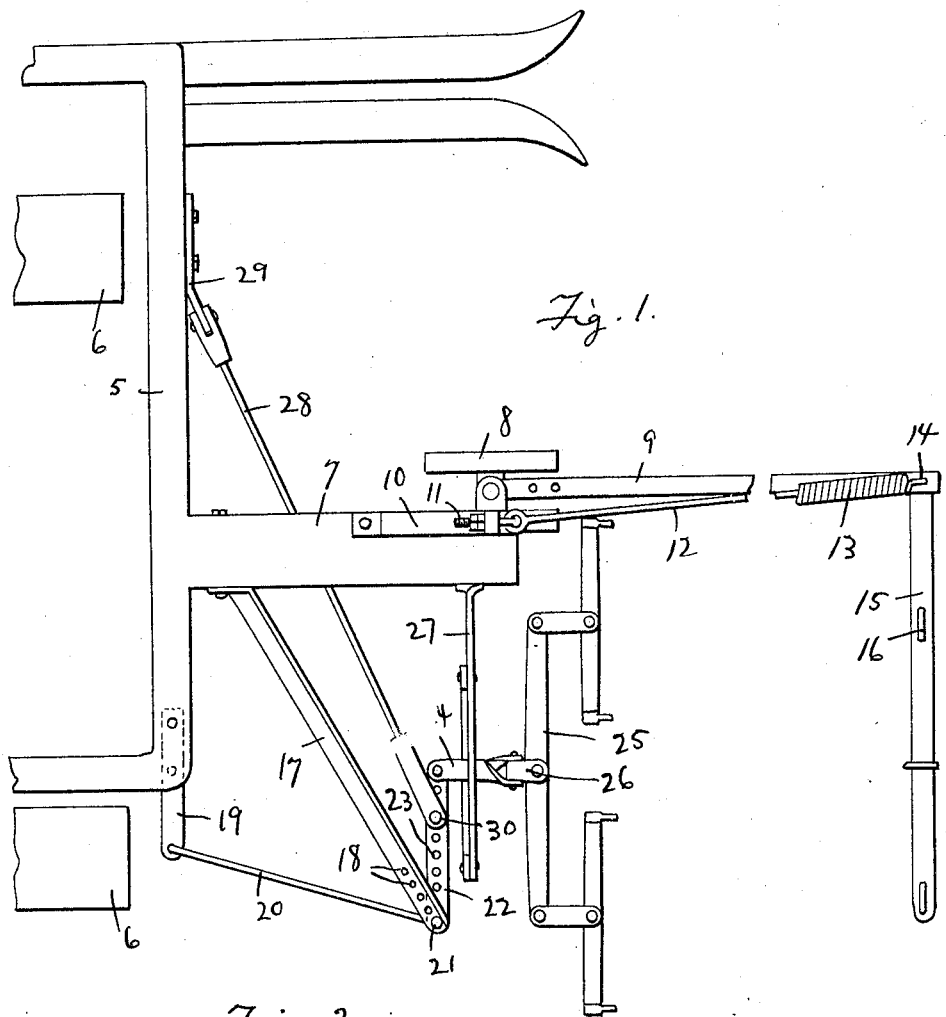
Fig. 1.
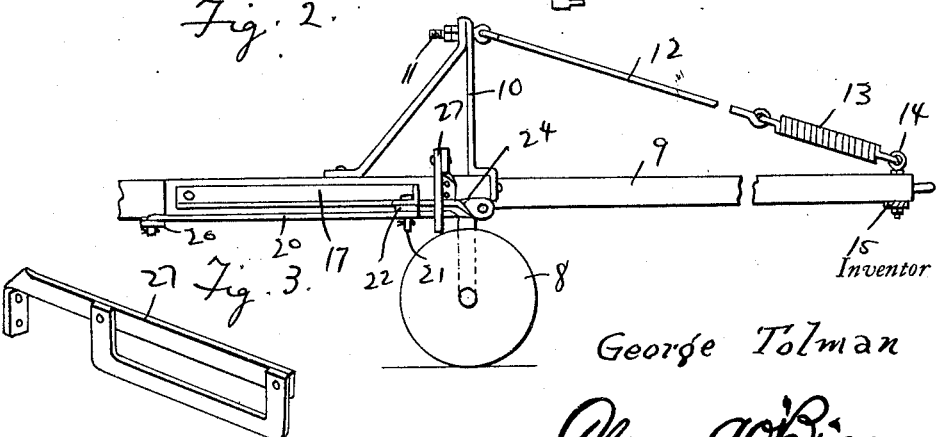
Fig. 2.
Fig. 3.
Inventor
George Tolman
By Clarence A. O'Brien
Attorney Patented Oct. 15, 1929

1,731,363

UNITED STATES PATENT OFFICE

GEORGE TOLMAN, OF ORANGE CITY, IOWA

OFFSET HITCH

Application filed February 6, 1928. Serial No. 252,263.

The present invention relates to a hitch designed particularly for use on agricultural machinery such as corn pickers and the like, or any other machinery.

The important object of the invention resides in the provision of a hitch whereby the draft animals may be located well to the side of the crops so as to eliminate the danger of the animals trampling down the standing or leaning crops without excessive side draft on the machine.

A further important object of the invention resides in the provision of an apparatus of this nature which is simple in its construction, inexpensive to manufacture, strong and durable, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of the apparatus embodying the features of my invention, Figure 2 is a side elevation thereof, and Figure 3 is a perspective view of a guide frame.

Referring to the drawing in detail it will be seen that the numeral 5 denotes the frame of a corn picker or any other machine, numeral 6 denotes the wheels thereof and numeral 7 denotes the stub tongue. The stub tongue is mounted on the usual wheel truck 8 and has a tongue 9 projecting forwardly therefrom. The parts thus far described are conventional and have been disclosed merely to exemplify the utility of my improved hitch structure about to be described.

A bracket 10 rises from the end of the stub tongue 7 and has engaged therewith by means of a bolt 11 a rod 12 which projects forwardly and inclines downwardly. The forward end of the rod 12 is engaged with a spring 13 which in turn is engaged with the forward end of the tongue 9 as at 14. The yoke bar 15 is engaged with the forward end of the tongue 9 as at 14 and projects laterally therefrom having suitable means 16 thereon for attachment to the yokes of the two animals. A forwardly and sidewardly projecting angle iron 17 is engaged on the side of the stub tongue 7 adjacent the rear end thereof. The forward end of the angle iron 14 has a plurality of apertures 18. A bar 19 projects laterally from the forward corner of the frame 5 and a brace rod 20 is engaged with the extremity thereof and with the angle bar 19 by means of a pin 21 projecting through one of the apertures 18. A plate 22 has a plurality of apertures 23 with one of which the pin 21 may be engaged. A hitch member 24 is engaged with the plate 22 and projects forwardly and has a double tree equalizer 25 engaged thereon as at 26. A guide frame 27 projects laterally from the forward end of the stub tongue 7 and has the hitch member 24 projecting therethrough and supported thereby. A brace rod 28 is engaged with a bracket 29 on the frame 5 to the other side thereof and is engaged by means of a pin 30 projecting through one of the apertures 23 with the plate 22.

With the hitch structure thus described in detail it will be seen that the draft animals may be placed well to the side of the crop being worked by the corn picker or other like apparatus. The animals may guide the apparatus through the yoke bar 15 as will be quite apparent.

The whole hitch is designed to set over the drawing center without excessive side draft on the machine.

It is thought that the construction, utility and advantages of the construction will now be quite apparent to those skilled in this art without a more detailed description thereof. The present embodiment of the invention has been disclosed in detail merely by way of example since in actual practice it attains the features of advantage enumerated as desirable in the statement of the invention and the above description.

It will be apparent that changes in the details of the construction, in the combination and arrangement of parts may be resorted to without departing from the spirit or scope of the invention as hereinafter claimed or sacrificing any of its advantages.

Having thus described my invention, what I claim as new is:

1. An offset hitch structure for a corn picker or the like; wherein the corn picker or the like comprises a frame having a stub tongue projected therefrom forwardly adjacent one side, a bar extension at the front of the frame at one side projecting laterally therefrom, an angle bar projecting forwardly and laterally from the rear end of the stub tongue, a rod connecting the forward end of the angle bar and the said first bar attached to the frame, a plate engaged with the angle bar and rod at their juncture with each other and projecting inwardly, a rod engaged with said plate and with the frame to the other side thereof, and a hitch member projecting forwardly from the inner end of the plate.

2. An offset hitch structure for a corn picker or the like; wherein the corn picker or the like comprises a frame having a stub tongue projected therefrom forwardly adjacent one side, a bar extension at the front of the frame at one side projecting laterally therefrom, an angle bar projecting forwardly and laterally from the rear end of the stub tongue, a rod connecting the forward end of the angle bar and the said bar attached to the frame, a plate engaged with the angle bar and rod at their juncture with each other and projecting inwardly, a rod engaged with said plate and with the frame to the other side thereof, a hitch member projecting forwardly from the inner end of the plate, a frame guide projecting laterally from the stub tongue through which the hitch member projects.

In testimony whereof I affix my signature.

GEORGE TOLMAN.